May 17, 1932.  J. L. GIBSON  1,858,665
FLUID CIRCULATING DEVICE FOR BOILER TUBES
Filed June 15, 1931
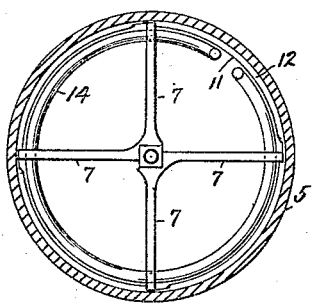
Fig. 2
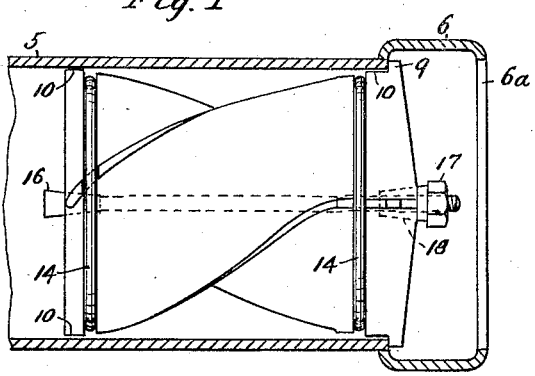
Fig. 1
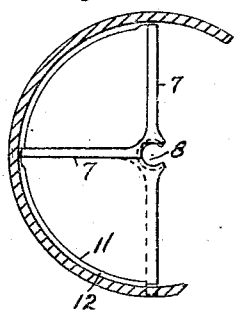
Fig. 4
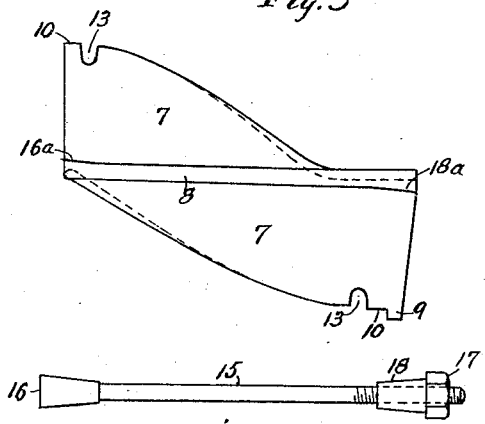
Fig. 3
Fig. 5.
INVENTOR
John L. Gibson
BY ATTORNEY
Wm Bodge Patented May 17, 1932

1,858,665

UNITED STATES PATENT OFFICE

JOHN L. GIBSON, OF BROOKLYN, NEW YORK

FLUID CIRCULATING DEVICE FOR BOILER TUBES

Application filed June 15, 1931. Serial No. 544,476.

My invention has general relation to fluid circulating devices for boiler tubes and more particularly with reference to the water tubes of steam boilers through which the water and steam normally flow at a relatively high velocity.

As ordinarily practiced in water tube boilers the water and generated steam travel through the tubes in straight paths, while the flow of hot gases around the outer surfaces thereof is to a large extent localized, acting under forced conditions to irregularly heat and warp the tubes and resulting in their general impairment.

The objects of the present invention include the provision of screw circulating devices fixedly disposed within the opposite ends of the tubes and adapted to impart by the forward flow of the water and steam a rotary movement thereto that serves to outwardly direct said flow against the inner surfaces of the tubes, and thus effect a lateral mixing action tending to uniformly heat the fluid and rapidly absorb the heat of the tubes, and to equalize the irregular heating action of the exterior gas thereon and overcome the warping effect thereof.

Also the present invention has relation to certain improvements in screw circulating devices of the general character described in my pending application No. 530,587, dated April 16, 1931, and comprising a device formed in multiple sections provided with means for detachably securing the circulating devices within the opposite ends of said tubes.

Also, to provide joint expansion means for the several screw sections to effect therefor a uniform clamping action against the inner surfaces of the tubes, and resilient retracting means adapted to contact said sections upon the release of said expansion means for the detachment of said screw sections.

Also, to provide an arrangement of screw parts adapted to simplify details of construction, provide against breakage under clamping stresses, and for the renewal of the parts occasioned by wear.

For further comprehension of the invention, and of the objects and advantages thereof, reference is had to the following description and accompanying drawings, and to the appended claims in which the various features of the invention are more particularly set forth.

Referring to the drawings in which similar characters of reference designate like parts throughout the several views:

Figure 1 is a longitudinal sectional view of an end of a boiler water tube, showing screw circulating sections positioned therein as embodied in the present invention.

Figure 2 is an assembly end view of the screw sections and tube, the latter being shown in transverse section.

Figure 3 is a longitudinal view of a screw section.

Figure 4 is an end view of a screw section shown in relation to a fragmental portion of a tube, the latter indicated transversely in section.

Figure 5 is a detail view of an expansion or lock bolt adapted to detachably secure the screw sections within the tubes.

In the drawings numeral 5 represents one end of an ordinary water tube of a steam boiler secured in well-known manner by expansion in the header section 6, the latter having an outer opening 6a alined with the tube, and provided with detachable caps, not herein shown, the uncovered opening indicating the passage through which the screw sections may be detachably connected within the tube end.

As herein shown the fluid circulating devices comprise two screw sections each formed with a pair of longitudinally connected screw-blades 7 having an axial passage 8. At their outer marginal ends the blades are provided with projecting stops 9 adapted to engage the ends of the tubes and limit the inward position of the screw sections. At their opposite ends the blades are provided with marginal clamp ledges 10 adapted upon the expansion of the sections to engage the inner surfaces of the tubes in clamped relation, and between the clamp ledges the outer edge of each blade is undercut at 11 to provide clearance passages 12 for affording a limited flow of the water and steam between the inner surface of the tube and the screw blades. At the opposite ends of the blades, adjacent the clamp ledges 10, retaining grooves 13 are formed for the reception of spring-rings 14, that normally serve to urge the impeller sections into retracted or closed position in which the clamp ledges are released for the detachment of the screw sections.

For expanding the screw sections, the axial passages 8 thereof are engaged by an expansion bolt 15, provided at its inner end with a square expansion head 16, fixed thereon and having their opposite side faces inwardly tapered toward each other and adapted in wedging manner to slidingly engage correspondingly tapered faces 16a formed at the inner ends of the axial passages 8 of the screw sections. At its opposite or outer end the expansion bolt 15 is formed with a threaded portion engaged by an expansion nut 17 having an inner conical end 18 adapted also in wedging manner to slidingly engage correspondingly tapered conical faces 18a formed at the outer ends of the axial passages 8 of the screw sections. By rotating the expansion nut 17 in one direction the opposite expansion members on the bolt 15 may be drawn toward each other and jointly expand the screw sections against the resilient action of the spring-rings 14 and effect a corresponding expansion of the clamp ledges 10 against the inner surface of the tube for locking connection therewith. And by turning the expansion nut 17 in the opposite direction the expansion members of the bolt will be released and permit the reaction of the spring-rings 14 to retract and close the screw sections and effect the release of the clamp ledges 10 for the detachment of the circulating devices.

I claim:

1. In a boiler tube of the class described, a screw circulating device formed longitudinally in separate sections insertable within said tube, and means adapted to jointly expand said sections and clamp the marginal edges of the screw-blades to the inner surface of said tube.

2. In a boiler tube of the class described, a circulating device formed longitudinally in separate sections insertable within said tube, screw-blades formed on said sections, and means engaging the opposite ends of said impeller for jointly expanding said sections and clamping the marginal edges of said screw-blades to the inner surface of said tube.

3. In a boiler tube of the class described, a circulating device formed longitudinally in separate sections insertable within said tube, screw-blades formed on said sections, resilient means normally arranged to contract said sections, and means adapted to jointly expand said sections against said resilient means.

4. In a boiler tube of the class described, a circulating device formed longitudinally in separate sections insertable within said tube, screw-blades formed on said sections, the outer ends of said screw-blades having stops projecting outwardly from the marginal edges thereof for engaging the outer end of said tube, and means for outwardly expanding said screw sections.

5. In a boiler tube of the class described, a screw circulating device formed in longitudinal separate sections insertable within said tube, clamp ledges formed on the marginal edges of the screw-blades at opposite ends thereof, and means for outwardly expanding the sections and effecting engagement between said clamp ledges and the inner surface of said tube.

6. In a boiler tube of the class described, a screw circulating device formed in longitudinal separate sections insertable within said tube, clamp ledges formed on the marginal edges of the screw-blades at opposite ends thereof, clearance passages formed on the marginal edges of the screw-blades between said clamp ledges, and means for outwardly expanding the sections and effecting engagement between said clamp ledges and the inner surface of the tube.

7. In a boiler tube of the class described, a screw circulating device formed in longitudinal separate sections insertable within said tube, transverse retaining grooves formed in the marginal edges of the screw-blades at opposite ends thereof, and spring-rings insertable within said grooves and normally clamp said impeller sections for the release thereof.

8. In a boiler tube of the class described, a screw circulating device formed in longitudinal separate sections insertable within said tube, axial expansion passages formed in said sections, and an expansion bolt engaging said passages for the outward expansion of said sections.

9. A circulating device of the class described comprising a plurality of screw-blade sections having axial expansion passages and concentric marginal outer edges, spring means disposed to contract said assembled sections, and means for expanding said assembled sections in opposition to said spring means.

Signed at New York, in the county of New York and State of New York, this 12th day of June, A. D. 1931.

JOHN L. GIBSON.